(12) United States Patent
Hathorn et al.

(10) Patent No.: US 9,130,874 B2
(45) Date of Patent: Sep. 8, 2015

(54) CONTROLLING SWITCH MECHANISM FOR DETECTING FIBRE CHANNEL OVER ETHERNET DATA FORWARDER FAILURE

(71) Applicant: International Business Machines Corporation, Armonk, NY (US)

(72) Inventors: Roger G. Hathorn, Tucson, AZ (US); Henry J. May, Cedar Falls, IA (US); Daniel Sentler, Steinenbronn (DE)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/084,729

(22) Filed: Nov. 20, 2013

(65) Prior Publication Data

US 2015/0138956 A1      May 21, 2015

(51) Int. Cl.
    H04L 12/939        (2013.01)
    H04L 12/931        (2013.01)

(52) U.S. Cl.
    CPC ............. H04L 49/557 (2013.01); H04L 49/70 (2013.01)

(58) Field of Classification Search
    None
    See application file for complete search history.

(56) References Cited

U.S. PATENT DOCUMENTS

| | | | |
|---|---|---|---|
| 8,082,340 B2 | 12/2011 | Filsfils et al. | |
| 2011/0258641 A1* | 10/2011 | Armstrong et al. | 719/327 |
| 2011/0261826 A1 | 10/2011 | Armstrong et al. | |
| 2012/0106957 A1 | 5/2012 | Willeke et al. | |
| 2012/0275316 A1 | 11/2012 | Wang | |
| 2012/0308232 A1* | 12/2012 | Eisenhauer et al. | 398/45 |
| 2015/0071288 A1* | 3/2015 | Ayandeh | 370/392 |
| 2015/0078201 A1* | 3/2015 | Chen et al. | 370/254 |
| 2015/0110122 A1* | 4/2015 | Fenkes et al. | 370/410 |
| 2015/0110487 A1* | 4/2015 | Fenkes et al. | 398/45 |

FOREIGN PATENT DOCUMENTS

| | | |
|---|---|---|
| EP | 2308213 B1 | 4/2011 |
| WO | 2011121664 A1 | 10/2011 |
| WO | 2014142980 A1 | 9/2014 |

OTHER PUBLICATIONS

Fibre Channel, Backbone—5 (FC-BB-5) REV 2.00, INCITS working draft proposed American National Standard for Information Technology, Jun. 4, 2009, Section 7.8.5, pp. 99-102, http://www.t11.org/ftp/t11/pub/fc/bb-5/09-056v5.pdf.

Fibre Channel, Backbone—6 (FC-BB-6) REV 1.2, INCITS working draft proposed American National Standard for Information Technology, Dec. 5, 2012, Section 7.12, pp. 151-160, http://www.t11.org/ftp/t11/pub/fc/bb-6/12-007v3.pdf.

* cited by examiner

*Primary Examiner* — Benjamin H Elliott, IV
(74) *Attorney, Agent, or Firm* — Patterson & Sheridan, LLP

(57) ABSTRACT

Techniques are provided for detecting failure of switching elements of a distributed switch configured to forward Fiber Channel over Ethernet (FCoE) frames. Periodic discovery advertisement messages, which include a fabric name fieldm, are transmitted between a controlling Fiber Channel Forwarder (cFCF) and a FCoE data forwarder (FDF). The cFCF determines a FDF has failed out of the switch fabric based on a reserved value in the fabric name field of a received discovery advertisement message, such as a zero or null value, and de-instantiates virtual links with that FDF.

13 Claims, 3 Drawing Sheets

CONTROLLING SWITCH MECHANISM FOR DETECTING FIBRE CHANNEL OVER ETHERNET DATA FORWARDER FAILURE

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

BRIEF SUMMARY

Embodiments of the present disclosure provide a method, product, and system for performing an operation for managing a distributed Fibre Channel fabric or a distributed Fibre Channel over Ethernet (FCoE) fabric in which FC frames are encapsulated in Ethernet frames. The distributed fabric may include a plurality of FCoE data-plane forwarders (FDFs) including a first FDF communicatively coupled to a controlling FCoE forwarder (cFCF). The method includes instantiating a first switch link between the cFCF and the first FDF, and receiving, from the first FDF, a first discovery advertisement message. The first discovery advertisement message may contain a fabric name field for identifying the distributed fabric, where the fabric name field comprises a first value. The method further includes, responsive to determining the first FDF is no longer part of the distributed fabric based on the first value of the fabric name field, de-instantiating the first switch link between the cFCF and the first FDF. The method includes instantiating a second switch link between the cFCF and the first FDF.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
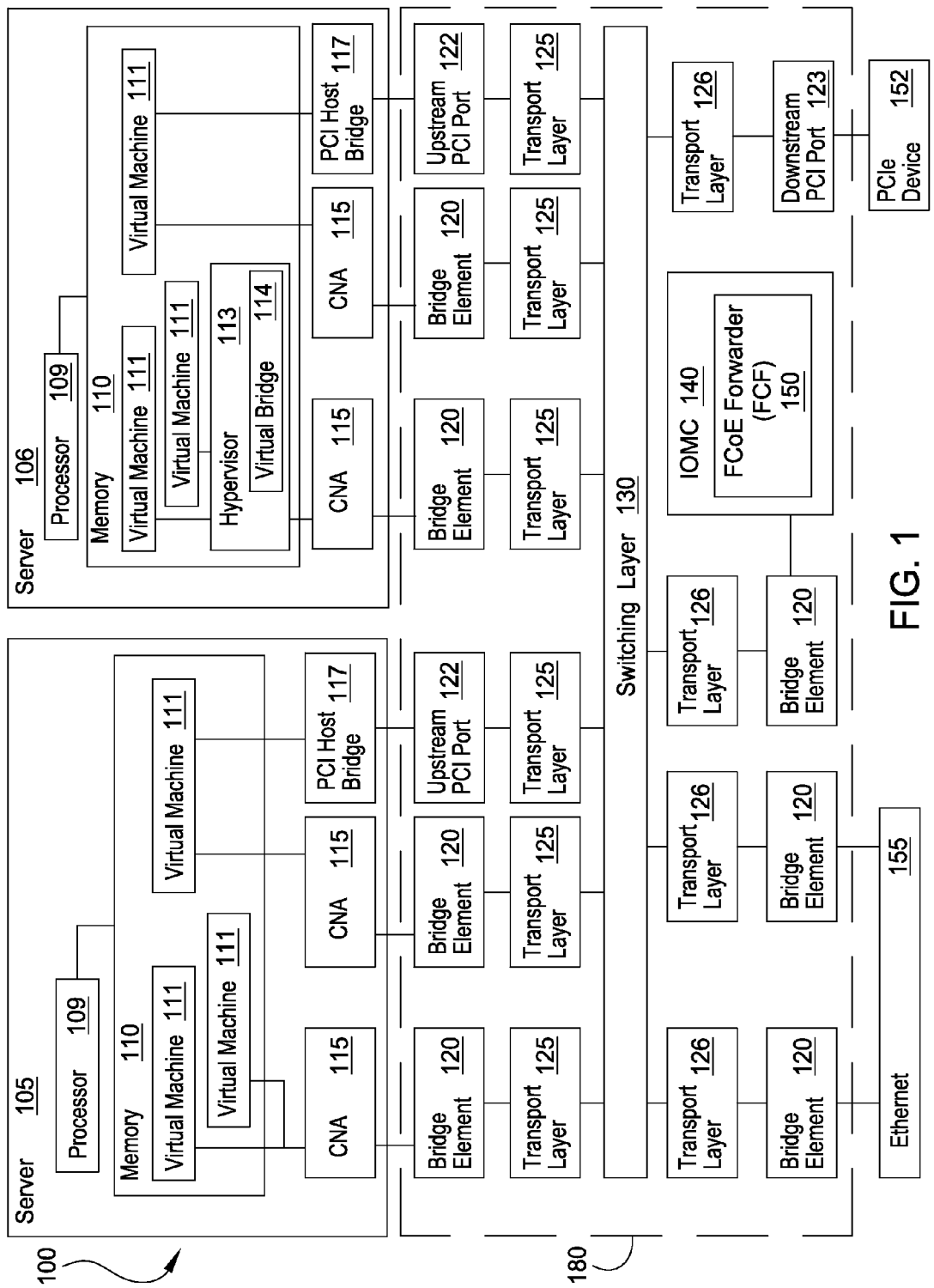
FIG. 1 illustrates a system architecture that includes a distributed network switch, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Devices may be connected on Fibre Channel systems using various interconnection topologies and devices, such as switches, hubs, and bridges, to allow scalability based on users' needs. As Fibre Channel networks get larger and network demands increase, switching may be implemented. A switched Fibre Channel network is referred to herein a "fabric." A fabric is simply the underlying switching architecture used by a Fibre Channel switch. A fabric may contain many loops interconnected with switches.

Fibre Channel over Ethernet (FCoE) refers to a technology used for transporting Fibre Channel (FC) frames over Ethernet, which is standardized at the Technical Committee for Fibre Channel (T11) of the International Committee for Information Technology Standards (INCITS). The transported FC frames used are based on an FC architecture for storage networking purposes. The FC-BB-6 and FC-SW-6 working groups of the T11 Fibre Channel standards committee are working to develop a distributed switch model with associated protocols. In conjunction with the technology used for transporting FC frames over Ethernet, a distributed switch model and associated protocols of the current state of the art may be applied to both FCoE switches or standard FC switches.

Switching elements of the Fibre Channel switch may rely on periodic "keep alive" messages to maintain virtual links between the switching elements. The switching elements may use the absence of an expected keep alive message (e.g., in a 20 second window) to detect when other switching elements have failed or have otherwise lost connectivity. However, such a mechanism may not work properly in cases where a switching element fails and restarts without exceeding the time window, which means other entities on the fabric may not become aware the failed switching element left the fabric at all. Particularly, this issue may arise for Fibre Channel switches in which one controlling component is responsible virtual link instantiation over another type of switching element, which failed and cannot initialize a process to join the fabric. As such, to address the deficiencies previously described, the illustrated embodiments provide a mechanism for a Fibre Channel forwarder virtual link maintenance sequence in a Fibre Channel switch environment, where a controlling Fibre Channel Forwarder (cFCF) is separated from a Fibre Channel over Ethernet (FCoE) data forwarder (FDF). The mechanisms, by way of example only, use a discovery advertisement message which contains a reserved value, such as a zero or null value, for fabric name field to determine that a FDF is no longer part of the fabric, de-instantiate old links with the FDF and establish new links with the FDF.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

The distributed network switch 180 may be configured to act as a FCoE Forwarder (FCF) 150, which is a Fibre Channel switching element that is able to forward FCoE frames across one or more switch ports to connected endpoints (i.e., servers 105, 106, storage devices). One example of an FCoE Forwarder is further described in the Fibre Channel Backbone 5 (FC-BB-5) standard published by T11 working group of the International Committee for Information Technology Standards (INCITS).

In the embodiment shown, IOMC 140 may include a Fiber Channel Forwarder 150. As discussed earlier, FCoE may offer the capability to transport fiber channel payloads on top of an Ethernet network. The FCF 150 may execute a Fiber Channel Initialization Protocol (FIP) to discover and initialize FCoE-capable entities connected to an Ethernet cloud. The FCF 150 may further include firmware that encapsulates and de-encapsulates Fiber Channel data frames (e.g., FCoE formatted data frames). In at least one embodiment, the Fiber Channel Forwarder 150 may translate between Ethernet and Fiber Channel protocols. In the embodiment shown, the IOMC 140 is depicted in FIG. 1 having an instance of a FCF 150 that manages execution of FCF functionality across the bridge elements 120 of the distributed network switch 180. In one embodiment, the FCF 150 may be a distributed FCF where a controlling FCF element provides FC services to a large number of endpoints through many intermediate switches. An example of a distributed FCF is shown in FIG. 2.

Figure 2:
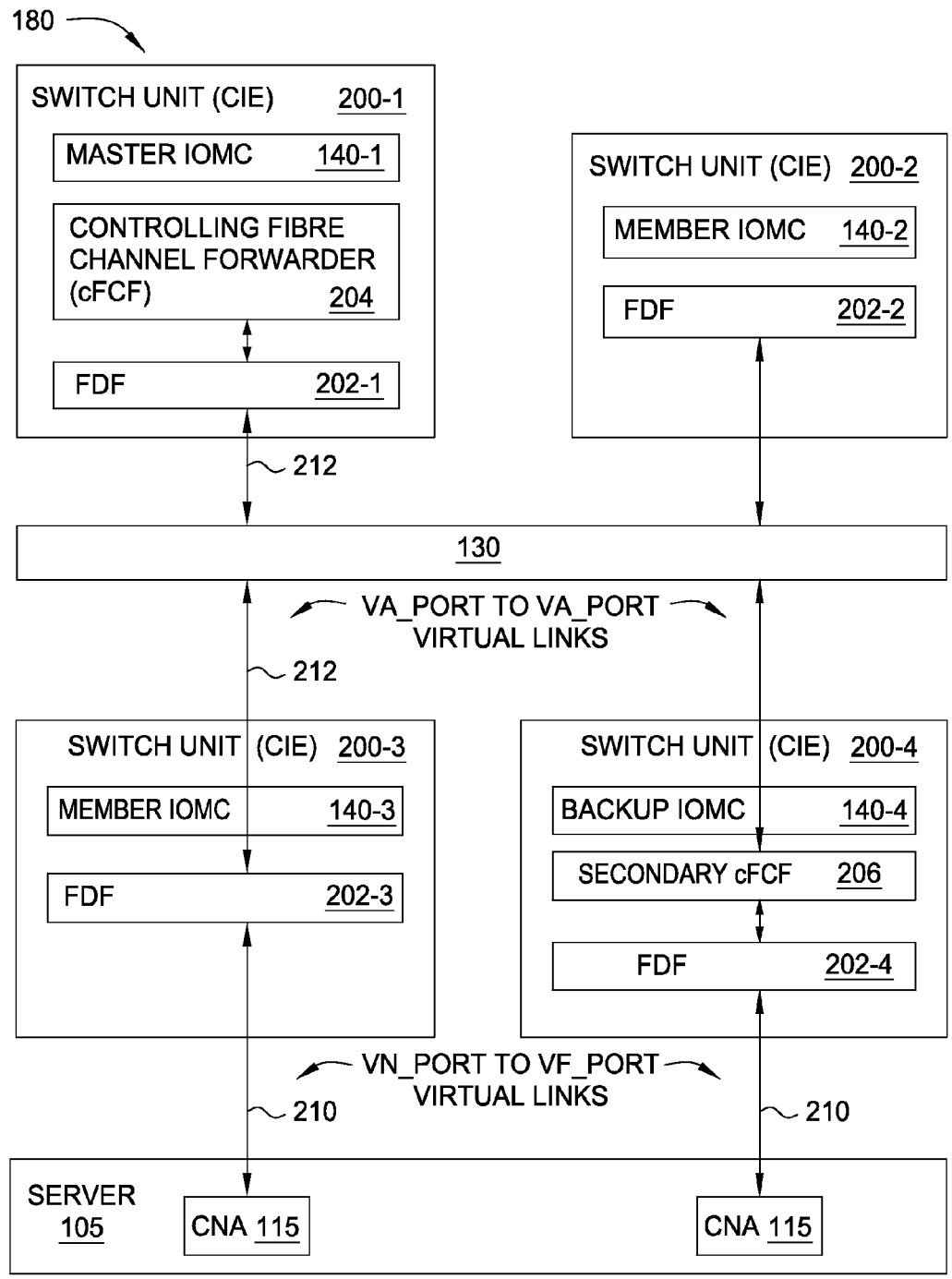
FIG. 2 illustrates the distributed network switch configured for Fibre Channel switching, according to one embodiment of the present disclosure.

FIG. 2 illustrates the distributed network switch 180 having a plurality of switch units 200 connected to the server 105, according to one embodiment of the present disclosure. The bridge elements 120 shown in FIG. 1 may be organized into one or more switch modules 200 (e.g., 200-1, 200-2, 200-3, 200-4). The distributed network switch 180 disclosed herein is configured to provide distributed FCoE switching via multiple switch modules 200, the switching layer 130 interconnecting the switch modules 200, and management firmware executing on a management controller, e.g., IOMC 140.

A switch module 200 (sometimes referred to as a chassis interconnect elements or CIE) may be a physical switch unit configured to provide network bridging for the distributed network switch 180. In one embodiment, the switch modules 200 are hardware components (e.g., PCB boards, FPGA boards, system on a chip, etc.) that provide physical support and connectivity between the network adapters 115 and the bridge elements 120 shown in FIG. 1. Each switch module 200 may include a logical or physical grouping of bridge elements 120. Each bridge element 120 may be a distributed Virtual Ethernet bridge (dVEB) configured to forward data frames throughout the distributed network switch 180, including data frames comprising FCoE frames. In one embodiment, each bridge element 120 may have at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection.

Referring back to FIG. 2, according to one embodiment, the distributed network switch 180 may be a distributed FCF having a set of FCoE Data Forwarders 202 (FDFs) associated with at least one controlling FCF 204, 206 that controls the operations of the set of FDFs. The cFCFs 204, 206 defines a control plane for managing the distributed FCF and the FDFs 202 define a data plane for forwarding FCoE frames. The cFCFs and FDFs operate together to behave as a single distributed FCF such that a FCoE frame ingressing on a port in one switch module 200 may be routed to egress from a port in any other switch module 200. From an external point of view (i.e., from the perspective of the server 105), the distributed FCF behaves as an FCF. In particular, the distributed FCF supports instantiation of VN_Port to VF_Port virtual links 210 with ENode MAC addresses (i.e., CNAs 115), and instantiation of VE_Port to VE_Port virtual links (not shown) with FCF-MACs. A "VN_Port" is a Virtual N_Port and refers to a port in an Enhanced Ethernet node (ENode), and a "VF_Port" is a Virtual F_port and refers to a port in an FCoE-capable Ethernet switch. A "VE_Port" is a Virtual E_port and refers to an inter-switch link port. From an internal point of view (i.e., from the perspective of the FCF), the distributed FCF may instantiate VA_Port to VA_Port virtual links 212 to enable FCoE frame forwarding between the cFCFs 204, 206 and FDFs 202, as well as between FDFs 202. A "VA_Port" is an instance of the FC-2V sublevel of Fibre Channel that connects to another VA_Port, and which is dynamically instantiated together with an FCoE_LEP on successful completion of a FIP ELP Exchange. VA_Port to VA_Port virtual links 212 may also be used to exchange control information between cFCFs 204, 206 and FDFs 202, as described in greater detail later.

In one embodiment, each switch module 200 may instantiate a FDF 202 (FDF), which are simplified FCoE switching entities that forward FC frames among ports through the distributed network switch 180. In one embodiment, a FDF 202 is a simplified FCoE switching element configured to forward FC frames among VA_Ports and VF_ports through a Fibre Channel data-plane forwarder (FCDF) switching element. In some embodiments, an FDF 202 is functionally composed of a FCDF switching element with at least one Lossless Ethernet MAC (FDF-MAC), which may be physical or virtual ports of a switch module 200. The FDF 202 may support instantiation of VA_Ports and VF_Ports over its FDF-MACs.

In one embodiment, at least one of the switch modules 200 includes a controlling FCoE forwarder 204, 206 (sometimes referred to as a controlling FCF, cFCF, or primary controlling switch). The cFCFs are configured to control and manage FDFs 202 to provide fabric services, through the FDFs 202 on each switch module 200, to all endpoints (e.g., server 105) connected to the switch ports. In the embodiment shown in FIG. 2, the switch modules 200 include a primary cFCF 204 that controls the FDFs 202, and a secondary cFCF 206 that synchronizes state with the primary cFCF 204 and is able to resume operation in case of failure of the primary cFCF 204. Examples of FDFs and cFCFs are described in the Fibre Channel Backbone-6 (FC-BB-6) and the Fibre Channel Switch Fabric 6 (FC-SW-6) standards published by T11 working group of the International Committee for Information Technology Standards (INCITS).

The primary cFCF 204 may be configured to perform a maintenance protocol for virtual links that includes monitoring the status of remote VE_ports and VA_Ports by maintaining timers and verifying that periodic "keep-alive" type messages are received within every determined period. In one implementation, the cFCFs may monitor the status of virtual links 210, 212 by verifying that periodic FIP Discovery Advertisements are received within a pre-determined periodic interval, sometimes referred to as a keep-alive period.

However, in some cases, such a mechanism may not work correctly if a FDF (e.g., FDF 202-1) crashes, restarts, and resumes transmitting discovery advertisements without exceeding the keep-alive period. In conventional Fibre Channel switch fabrics, an endpoint that resumes after a crash can transmit a FIP Fabric Login (i.e., FLOGI) to a FCF, which recognizes the ENode MAC in the FIP FLOGI as an entity that had already established connections and uses that knowledge as a trigger to de-instantiate those links and instantiate new links. However, such a mechanism may not be suitable for a distributed network switch 180 having cFCFs 204, 206 and a plurality of FDFs 202, which may not be configured to initialize the virtual link setup process unless another entity has already instantiated virtual links with the FDFs. For example, in some embodiments, when maintaining a VA_Port to VA_Port link (e.g., link 212) between the primary cFCF 204 and the FDFs 202, a FDF 202 may not be configured to initiate a virtual link instantiation process with a discovered VA_Port-capable FDF-MAC unless the FDF 202 already has at least one VA_Port to VA_Port virtual link with the primary cFCF 204 or another FDF 202. In other words, in some embodiments, the failure of an FDF may go undetected, and the FDF may be unable to join the switch fabric and instantiate a new link under its own initiative. Accordingly, embodiments of the present disclosure provide a mechanism for detecting FCoE Data Forwarder (FDF) failure. In one embodiment, the mechanism modifies the Discovery Advertisements that are periodically transmitted to include a fabric name set to zero or a null value. The null fabric name may be used by a primary cFCF 204 to recognize failure of the FDFs and initiate a process to re-instantiate a virtual link with the failed FDF(s).

Figure 3:
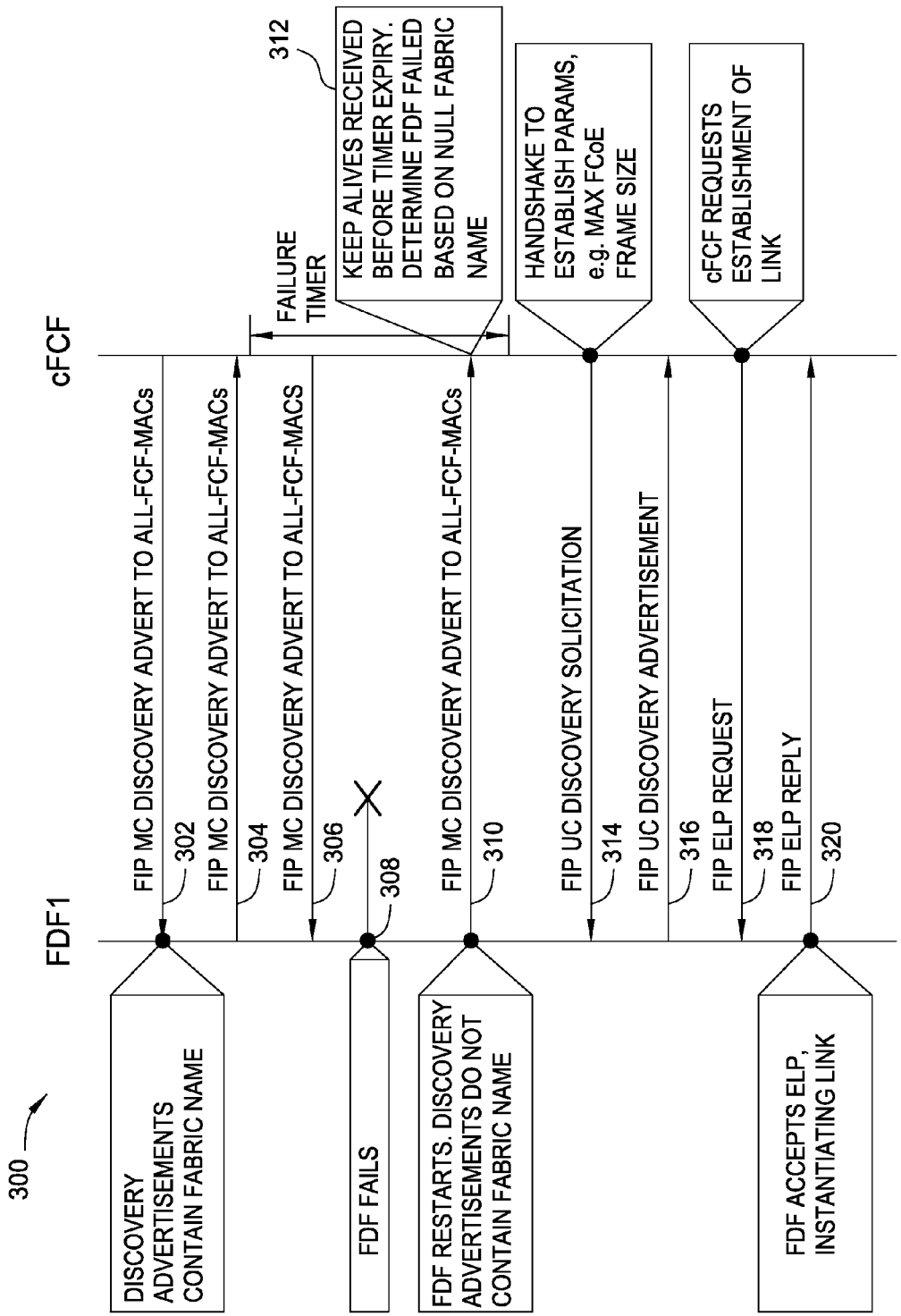
FIG. 3 is a sequence diagram depicting a method for detecting FCoE data forwarder failure in the distributed network switch, according to one embodiment of the present disclosure.

FIG. 3 is a sequence diagram depicting a method 300 for detecting FCoE data forwarder failure in the distributed network switch, according to one embodiment of the present disclosure. FIG. 3 illustrates how an FDF 202 (e.g., FDF1) and a cFCF 204 maintain a virtual link between each other on the distributed network switch 180 and re-instantiate the virtual link through a FCoE Initialization Protocol (FIP) discovery protocol, although it should be appreciated that other protocols may be used. In one example scenario, the FDF1 may be a switch module 200 having an existing virtual link 212 established to the primary cFCF 204 within the distributed network switch 180.

As shown, the method 300 begins at step 302, where the cFCFs and FDFs periodically transmit keep-alive messages that advertise their status and parameters related to joining the fabric. At step 302 (and at step 306), the cFCF 204 transmits a discovery advertisement to switching elements (e.g., FDFs 202) within the distributed network switch 180. In some embodiments, the cFCF 204 broadcasts (e.g., via multicast) a FIP Discovery Advertisement message to the "All-FCF-MACs" group address listened to by FDFs within the distributed network switch at least once every keep-alive period.

Similarly, at step 304, the FDF1 transmits (e.g., via multicast) a discovery advertisement to switching elements (e.g., FDFs 202 and cFCF 204) within the distributed network switch 180. In one embodiment, if an FDF 202 is part of a distributed FCF internal topology, all VA_Port capable and VF_port capable FDF-MACs on that FDF may have the fabric name (received from the cFCF 204) in the fabric name of the fabric descriptor in all transmitted discovery advertisements.

In one embodiment, a Discovery Advertisement message may include a priority descriptor used by endpoints to select a FCF to which to perform a FIP login, a MAC address descriptor, a name identifier descriptor, a fabric descriptor, and a period descriptor (i.e., FKA_ADV_PERIOD) which specifies a keep-alive period for periodic reception and transmission of keep alive messages. In some embodiments, the keep-alive period may be determined on the distributed network switch by user configuration or input. If the keep-alive period is changed (e.g., via system administrator), the updated keep-alive period may be advertised in the period descriptor in subsequent multicast Discovery Advertisements and transmitted at the interval specified by the updated value. In some embodiments, the keep-alive period may be randomized by adding a random delay uniformly distributed between 0 and 100 ms to avoid synchronized bursts of multicast traffic within the network. Table 1 illustrates one embodiment of the fabric descriptor used in FIP operations.

TABLE 1

Example FIP Fabric Descriptor Format

| Word \ Bit | 31-24 | 23-16 | 15-8 | 7-0 |
|---|---|---|---|---|
| 0 | Type = 05 h | Length = 04 h | Reserved | VF_ID |
| 1 | Reserved (MSB) | | FC-MAP | (LSB) |
| 2 | (MSB) | Fabric_Name | | |
| 3 | | | | (LSB) |

As shown, in one embodiment, the fabric descriptor includes a virtual fabric identifier (VF_ID) field that specifies a value that uniquely identifies a virtual fabric among all the virtual fabrics that share a set of switches and ports, a Fibre Channel Mapped Address Prefix (FC-MAP) field that specifies the value to be used as the most significant 24 bits in Fabric Provided MAC Addresses (FPMAs), and a fabric name which identifies the fabric. According to one embodiment, discovery advertisements may contain only a single Fabric descriptor, and all discovery advertisements from an FCF in a VLAN may contain the same single Fabric descriptor. The VF_ID field in the fabric descriptor may be set to the VF_ID identifying the advertised fabric. If a VF_ID field is not defined for the advertised fabric, the VF_ID field may be set to zero. The FC-MAP field in the fabric descriptor may be set to the FC-MAP value the FCF is using. If the FC-MAP value is not administratively configured, then the FC-MAP value may be set to a default FC-MAP value. According to one embodiment, the fabric name field in the fabric descriptor is set to the fabric name for the originating FCF.

In one embodiment, the discovery advertisements exchanged between the cFCF 204 and the FDF1 contain the fabric name, such as a World Wide Name (WWN), that identifies the fabric to connected entities. The fabric is configured to present the same name to an endpoint, regardless of the switch module 200 that owns the port where the endpoint is attached. In one embodiment, the fabric name contained within the discovery advertisement may be a name identifier associated with the fabric and that is unique within the fabric. In one implementation, fabric names as referred to herein may have a 48-bit address similar to a 48-bit IEEE Standard 802.1a Universal LAN MAC Address format, although other formats may be utilized.

Upon receiving the multicast discovery advertisement from the FDF1, the cFCF 204 may generate an entry associated with the FDF in an internal FCF list. In one implementation, the cFCF 204 creates an entry for the FDF (and any other FDFs) from which the cFCF receives at least one Discovery Advertisement with the WWN associated with the cFCF 204 present in the fabric name descriptor. The cFCF 204 monitors the status of each FDF by verifying receipt of keep-alive messages, such as unsolicited Discovery Advertisements, from that FDF at least once every keep-alive period. If unsolicited multicast Discovery Advertisement messages are not received within a threshold period, for example, based on expiry of a failure timer, the cFCF 204 may deem the virtual link with that FDF as a virtual link failure. In some embodiments, the threshold period of detecting link failure may be set by user configuration (e.g., by a system administrator), or in other embodiments, may be a multiple of the keep-alive period used for periodically sending the discovery advertisements (e.g., 2.5 times the keep-alive period).

As mentioned above, in some cases, the FDF may fail, restart, and resume operation before the failure timer at the cFCF has expired. For example, at step 308, the FDF1 suffers a failure, such as a software crash, hung operation, hardware failure, loss of network connectivity, loss of power, etc. As shown, due to the failure experienced, the FDF1 might fail to transmit the keep-alive message (e.g., multicast Discovery Advertisement message) to the cFCF 204 and other switching elements of the distributed network switch 180. However, as shown in FIG. 3, the FDF1 is able to restart, recover, and resume operation, including the periodic transmission of multicast discovery advertisements, prior to expiry of the failure timer at the cFCF 204.

At step 310, the FDF1 transmits a periodic Discovery Advertisement message to the cFCF 204 and other FDFs 202 (e.g., via the "All-FCF-MACs" group address) within the distributed network switch 180. In one embodiment, the FDF 202 is configured such that if an FDF is not (yet) part of a distributed FCF internal topology, all VA_Port capable FDF-MACs on that FDF shall transmit Discovery Advertisements with the fabric name of the fabric descriptor set to a particular value, such as a zero or null value, indicating the FDF is not part of any Distributed Fibre Channel fabric. As such, when resuming operation, the FDF1 transmits multicast Discovery Advertisement messages that do not contain the fabric name of the switch fabric, i.e., contains a zero or null value for the fabric name, because the FDF1 may be deemed no longer part of the switch fabric upon its failure. The FDF1 continues to send multicast discovery advertisements that have the zero value for the fabric name until the FDF completes initialization exchanges with the cFCF and is considered part of the fabric.

At step 312, the cFCF 204 receives the multicast discovery advertisement messages from the FDF1. The cFCF 204 is configured to examine the Fabric Name field in discovery advertisements from any FDFs that the cFCF believes are part of the fabric. As the cFCF 204 had previously received a discovery advertisement containing the WWN of the switch fabric (e.g., at step 304) from FDF1, and had been inserted into the internal FCF list, the cFCF 204 believes FDF1 is currently part of the switch fabric. In one or more embodiments, the cFCF 204 determines the Fabric Name field of the received discovery advertisement messages from FDF1 to be the particular value, such as a zero or null value, indicating the FDF1 is not part of the fabric. As such, the cFCF 204 determines that the FDF1 has failed and/or left the switch fabric in an undetected fashion, based on the zero value for the WWN in the fabric name descriptor field now found in the received discovery advertisements. In some embodiments, the cFCF 204 determines that the FDF is not part of the fabric based on the zero value for the fabric name, even though the cFCF's internal state indicates otherwise. For example, the internal FCF list maintained by the cFCF might indicate the FDF is still deemed alive because the failure timer associated with that FDF has not yet expired.

Responsive to determining the FDF is not part of the fabric based on the zero value for the WWN in the fabric name descriptor, the cFCF 204 may de-instantiate virtual links associated with that FDF1 (e.g., VA_Port to VA_Port virtual link 212), along with the associated ports (e.g., the associated VA_Port), and remove the FDF1 from the internal FCF list. In one embodiment, the cFCF 204 de-instantiates the virtual links associated with the FDF by generating and transmitting, to the FDF1, a FIP Clear Virtual Links frame that specifies the virtual link with the cFCF and associated VA_Ports to be de-instantiated. The FIP Clear Virtual Links message may explicitly (by enumeration on a list) or implicitly (by a "clear all" indication) specify the associated VA_Ports of the FDF to be de-instantiated. In one implementation, the FIP Clear Virtual Link message contains a plurality of fields, such as, a FCF-MAC address of the originating cFCF, a FCF-MAC address of the FDF1, a port name identifying the VA_Port of the FDF1, and optionally, a Reason Code descriptor, which may be used to indicate that a null fabric name value was received from a FDF previously part of the fabric as the reason for clearing the virtual link.

In some embodiments, responsive to determining the FDF is not part of the fabric anymore, the cFCF 204 may notify other FDFs and the secondary cFCF 206 within the distributed network switch of the missing FDF1. In one implementation, the cFCF may re-compute routes for forwarding FCoE frames within the distributed network switch (i.e., N_Port_ID routes) based on the missing FDF1, and distribute the recomputed routes to each FDF belonging to the distributed switch through N_Port_ID Route Distribution (NPRD) exchanges.

While FIG. 3 depicts one technique for determining FDF failure based on reception of a single Discovery Advertisement having a zero value for the fabric name, it should be recognized that other triggering conditions may be used. For example, in one embodiment, the cFCF 204 may de-instantiate virtual links with the FDF1 based on reception of two or more consecutive Discovery Advertisements which contain zero for the WWN in the fabric name descriptor. In another example, the cFCF 204 may de-instantiate virtual links with the FDF1 based on reception of multiple Discovery Advertisements having a zero value for the fabric name within a particular time period that is less than the failure timer. Furthermore, while the embodiments described herein use a zero or null value for the fabric name descriptor to indicate a FDF has failed and/or is no longer part of the fabric, it should be recognized that other values may be used, such as a pre-determined bit sequence or value, as well as other types of schemes, such as using identifier information of the failed FDF in the fabric name field.

Upon de-instantiating previous virtual links with the FDF1, the cFCF may proceed to establish new links to the missing FDF1 by performing an ELP exchange. At step 314, responsive to receiving the discovery advertisement from the FDF1, the cFCF 204 transmits a unicast discovery solicitation to the FDF1 to initiate a handshake process that establishes parameters for communicating between the cFCF 204 and the FDF 202 and parameters of the fabric. For example, the cFCF 204 transmits a unicast FIP Discovery Solicitation messages may include a maximum FCoE PDU (protocol data unit) size the cFCF 204 intends to use for FCoE traffic. In some embodiments, upon receiving the Discovery Advertisement, the cFCF 204 may verify whether that the FC-MAP value in the Fabric descriptor in the Discovery Advertisement is the same as the FC-MAP value of the recipient FCF. If not, the cFCF 204 may discard the Discovery Advertisement. In some embodiments, upon receiving the Discovery Advertisement, the FCoE controller of a VA_Port/VE_Port-capable FCF-MAC (e.g., cFCF 204) may create another entry for the FDF in the internal FCF list.

At step 316, responsive to receiving the unicast discovery solicitation from the cFCF 204, the FDF1 transmits a unicast FIP Discovery Advertisement to the cFCF 204. In one implementation, responsive to receiving the solicited unicast Discovery Advertisement from the FDF1, the cFCF may set the 'Max FCoE Size Verified' bit to one in the entry for that FDF1 in the internal FCF list of the cFCF 204. At step 318, the cFCF 204 requests establishment of a port-to-port link between the cFCF 204 and the FDF1. In some embodiments, the cFCF 204 transmits a FIP Exchange Link Parameters (ELP) request to the FDF1. At step 320, the FDF1 accepts the ELP request, re-instantiating a virtual link between at least one port associated with the FDF1 and at least one port associated with the cFCF 204, and transmits a FIP ELP reply back to the cFCF 204. At this point, the re-instantiated link again becomes part of the distributed switch internal topology (i.e., the set of links internal to the distributed switch). In one embodiment, at this point, the FDF1 considers itself part of the fabric and includes the fabric WWN in discovery advertisements. For example, when the FDF1 broadcasts a FIP multicast Discovery Advertisement message to the "All-FCF-MACs" group address listened to by switching elements within the distributed network switch, the Discovery Advertisement message contains the WWN of the fabric. Similarly, when FDF1 broadcasts a FIP multicast Discovery Advertisement message to an "All-ENode-MACs" group address listened to by endpoints logged into the distributed network switch, including the CNA 115 of the server 105, the Discovery Advertisement message contains the WWN of the fabric.

While FIG. 3 depicts the cFCF as the entity determining that FDF1 is no longer part of the distributed Fibre Channel fabric, other switching elements within the distributed Fibre Channel fabric, such as other FDFs 202, may be used. For example, a newly recovered FDF1 broadcasts a multicast discovery advertisement message (containing a null fabric name) to multiple entities, including other FDFs 202. As such, other FDFs 202 may be configured to, alternatively or in conjunction with the cFCF, determines that a FDF is no longer part of the distributed Fibre Channel fabric based on the zero or null value of the fabric name in the discovery advertisement messages.

Accordingly, embodiments of the present disclosure provide a mechanism for the distributed network switch to detect FDF failure, particularly in embodiments where one component (e.g., cFCF) is responsible virtual link instantiation over another component (e.g., FDF). Further, embodiments of the present disclosure enable the distributed network switch to pro-actively notify the cFCFs of fabric changes without having to wait for the threshold period of time to be exceeds, which, in some configurations, can be as long as 20 seconds.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for managing a distributed Fibre Channel over Ethernet (FCoE) fabric configured to encapsulate Fibre Channel frames in Ethernet frames, the computer program product comprising:
   a non-transitory computer-readable storage medium having computer-readable program code embodied therewith, the computer-readable program code comprising:
   computer-readable program code, executable by a processor, configured to instantiate a first switch link between a controlling FCoE forwarder (cFCF) of the distributed FCoE fabric and a first FCoE data-plane forwarder (FDF), wherein the distributed FCoE fabric further comprises a set of FDFs;
   computer-readable program code configured to receive, from the first FDF, a first discovery advertisement message that contains a fabric name field for identifying the distributed FCoE fabric, wherein the fabric name field comprises a first value;
   computer-readable program code configured to, responsive to determining the first FDF is no longer part of the distributed FCoE fabric based on the first value of the fabric name field, de-instantiate the first switch link between the cFCF and the first FDF; and
   computer-readable program code configured to instantiate a second switch link between the cFCF and the first FDF.

2. The computer program product of claim 1, further comprising:
   computer-readable program code configured to de-instantiate the first switch link responsive to not receiving any discovery advertisements from the first FDF within a time period; and
   wherein the first discovery advertisement message that contains the first value of the fabric name field is received prior to expiration of the time period.

3. The computer program product of claim 1, wherein the computer-readable program code configured to determine the first FDF is no longer part of the distributed FCoE fabric further comprises:
   computer-readable program code configured to determine the first FDF is no longer part of the distributed FCoE fabric based on reception, from the first FDF, of at least two consecutive discovery advertisement messages having a fabric name set to the first value.

4. The computer program product of claim 1, further comprising:
   computer-readable program code configured to, prior to receiving the first discovery advertisement message having the first value of the fabric name field, receive from the first FDF a second discovery advertisement message comprising a second fabric name field that contains a world-wide name (WWN) associated with the distributed FCoE fabric.

5. The computer program product of claim 1, further comprising:

computer-readable program code configured to, responsive to determining the first FDF is no longer part of the distributed FCoE fabric based on the first value of the fabric name field, notify the set of FDFs that the first FDF is no longer part of the distributed FCoE fabric by transmitting a route distribution message.

6. The computer program product of claim 1, wherein the computer-readable program code configured to de-instantiate the first switch link between the cFCF and the first FDF further comprises:

computer-readable program code configured to transmit, to the first FDF, a Clear Virtual Links message that specifies the first switch link and associated ports of the first FDF to be de-instantiated.

7. The computer program product of claim 1, wherein the first value comprises a zero value indicating the first FDF is not part of any distributed FCoE fabric.

8. A system comprising:

a distributed Fibre Channel over Ethernet (FCoE) fabric configured to encapsulate Fibre Channel frames in Ethernet frames, wherein the distributed FCoE fabric comprises a plurality of FCoE data-plane forwarders (FDFs) including a first FDF communicatively coupled to a controlling FCoE forwarder (cFCF);

wherein the cFCF, by operation of one or more computer processors of the cFCF, is configured to perform an operation comprising:

instantiating a first switch link between the cFCF and the first FDF;

receiving, from the first FDF, a first discovery advertisement message that contains a fabric name field for identifying the distributed FCoE fabric, wherein the fabric name field comprises a first value;

responsive to determining the first FDF is no longer part of the distributed FCoE fabric based on the first value of the fabric name field, de-instantiating the first switch link between the cFCF and the first FDF; and instantiating a second switch link between the cFCF and the first FDF.

9. The system of claim 8, wherein the cFCF is configured to de-instantiate the first switch link responsive to not receiving any discovery advertisements from the first FDF within a time period; and wherein the first discovery advertisement message that contains the first value of the fabric name field is received prior to expiration of the time period.

10. The system of claim 8, wherein determining the first FDF is no longer part of the distributed FCoE fabric further comprises:

determining the first FDF is no longer part of the distributed FCoE fabric based on reception, from the first FDF, of at least two consecutive discovery advertisement messages having a fabric name set to the first value.

11. The system of claim 8, further comprising:

prior to receiving the first discovery advertisement message having the first value of the fabric name field, receiving from the first FDF a second discovery advertisement message comprising a second fabric name field that contains a world-wide name (WWN) associated with the distributed FCoE fabric.

12. The system of claim 8, further comprising:

responsive to determining the first FDF is no longer part of the distributed FCoE fabric based on the first value of the fabric name field, notifying the plurality of FDFs that the first FDF is no longer part of the distributed FCoE fabric by transmitting a route distribution message.

13. The system of claim 8, wherein the first value comprises a zero value indicating the first FDF is not part of any distributed FCoE fabric.

* * * * *